United States Patent
Gottschalk et al.

(10) Patent No.: US 12,147,921 B2
(45) Date of Patent: Nov. 19, 2024

(54) SYSTEM AND METHOD FOR PROVIDING SHORT-TERM DISPATCHING DECISIONS FOR OPERATING A NUMBER OF RESOURCES INVOLVED IN A NUMBER OF PRODUCTION PROCESSES UNDER CONSIDERATION OF LONG-TERM OBJECTIVES

(71) Applicant: Siemens Aktiengesellschaft, Munich (DE)

(72) Inventors: Corinna Gottschalk, Munich (DE); Rafael Fink, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/184,649

(22) Filed: Feb. 25, 2021

(65) Prior Publication Data

US 2022/0270012 A1    Aug. 25, 2022

(51) Int. Cl.
| | |
|---|---|
| *G06Q 10/0631* | (2023.01) |
| *G06Q 10/04* | (2023.01) |
| *G06Q 10/0633* | (2023.01) |
| *G06Q 10/0637* | (2023.01) |
| *G06Q 50/04* | (2012.01) |

(52) U.S. Cl.
CPC ....... *G06Q 10/06314* (2013.01); *G06Q 10/04* (2013.01); *G06Q 10/06313* (2013.01);
(Continued)

(58) Field of Classification Search
CPC .............................................. G06Q 10/06313
See application file for complete search history.

(56) References Cited

U.S. PATENT DOCUMENTS

| | | | |
|---|---|---|---|
| 5,231,567 A | 7/1993 | Matoba | |
| 6,687,563 B1 * | 2/2004 | Wang | G05B 19/41865 700/121 |

(Continued)

FOREIGN PATENT DOCUMENTS

| | | | | |
|---|---|---|---|---|
| CA | 2744118 A1 * | 1/2012 | ............ | F01K 13/02 |
| EP | 0488246 B1 | 5/1998 | | |

OTHER PUBLICATIONS

Stefano Giordani, Marin Lujak, Francesco Martinelli, "A distributed multi-agent production planning and scheduling framework for mobile robots," Computers & Industrial Engineering, vol. 64, Issue 1, 2013, pp. 19-30 (Year: 2013).*

(Continued)

*Primary Examiner* — Amanda Gurski
(74) *Attorney, Agent, or Firm* — Schmeiser, Olsen & Watts LLP

(57) ABSTRACT

The disclosed is a system and production processes, comprising a processor to perform the steps: a) obtaining a long-term production schedule containing production operations for a set of production orders by using forecasted values for production operation durations; b) deriving dispatching recommendations for suitable order release dates, dispatching sequences and/or resource choices of all subsequent operational dispatching decisions from the obtained long-term production schedule; c) obtaining a released subset of the set of production orders having each a release date and a due date and including information of all possible dispatching sequences and logical dependencies between them to produce a requested product; d) iteratively calculating subsequent operational dispatching decisions based on operational constraints and on the derived dispatching recommendations which support a decision-making in favor of optimizing the overall production process with respect to (Continued)

Figure 1:
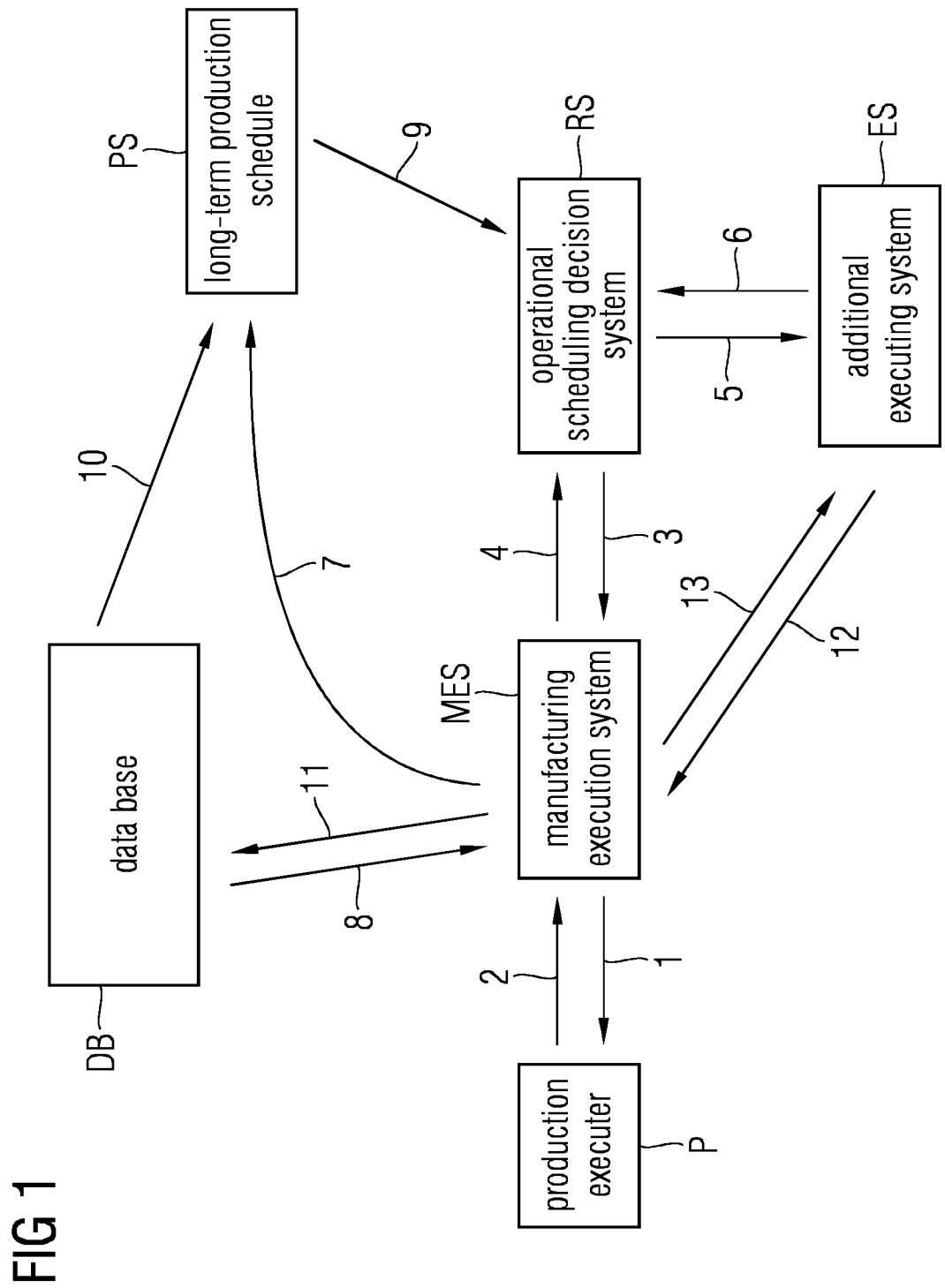

long-term objectives; e) outputting each calculated operational dispatching decision to a production executer.

16 Claims, 2 Drawing Sheets

(52) U.S. Cl.
CPC ... *G06Q 10/06316* (2013.01); *G06Q 10/0633* (2013.01); *G06Q 10/0637* (2013.01); *G06Q 50/04* (2013.01)

(56) References Cited

U.S. PATENT DOCUMENTS

| | | | |
|---|---|---|---|
| 7,962,233 | B2 | 6/2011 | Tiozzo |
| 2006/0143063 | A1* | 6/2006 | Braun ............... G06Q 10/0631 705/7.12 |
| 2006/0212323 | A1* | 9/2006 | Ninomiya ............ G06Q 10/087 705/7.29 |
| 2019/0086904 | A1 | 3/2019 | Fischer |
| 2020/0104760 | A1* | 4/2020 | Hashimoto ...... G06Q 10/06313 |
| 2021/0056484 | A1* | 2/2021 | Serita .................... G06Q 10/06 |

OTHER PUBLICATIONS

Wyman F P ED et al: "Common Features of Simulation Based Scheduling"; Proceedings of the Winter Simulation Conference. Phoenix; Dec. 8-11, 1991; [Proceedings of the Winter Simulation Conference]; New York; IEEE; US; vol. CONF. 23; Dec. 8, 1991 (Dec. 8, 1991); pp. 341-347; XP000347534; paragraphs [3 .1. 4], [04. 4], [05. 5], [06. 9].

* cited by examiner

SYSTEM AND METHOD FOR PROVIDING SHORT-TERM DISPATCHING DECISIONS FOR OPERATING A NUMBER OF RESOURCES INVOLVED IN A NUMBER OF PRODUCTION PROCESSES UNDER CONSIDERATION OF LONG-TERM OBJECTIVES

FIELD OF TECHNOLOGY

The invention relates to a system and a method for providing dispatching decisions for operating a number of resources involved in a number of production processes, whereby each production process comprises a number of production operations.

BACKGROUND

In this context dispatching decisions are usually made under consideration of short-term objectives.

The invention can be applied in the world of process automation and process monitoring standard automation systems for controlling a wide conceivable variety of machines and plants. Such technology covers in particular a broad range of products which can be offered within the field of manufacturing operation management (MOM).

In this context a broad range of IT solutions exists to connect the actual hardware close to the technical and/or logistical process to the application layer of the client driving the installation. Manufacturing execution systems (MES) have therefore been developed to meet all of the requirements of a service-oriented architecture (SOA) to integrate seamlessly into a totally integrated automation (TIA).

This demand very often requires in the backbone rather complicated and sophisticated software solutions which enable the approach of totally integrated automation. In view of this, the software engineers very often use production modeling software to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and need serious testing to check whether the translated program behaves the same as the original string/term of the high level graphical language.

Within a MES environment a software for a detailed production scheduling (DPS) is provided which concerns the sequencing and the timing of production operations on all manufacturing resources. Above all, this software has the aim to create an executable and optimized production schedule according to which the production operations will be executed in production. Before the schedule will be computed, the PDS software needs to be fed with the main input from a plant database such as:
  a) the plant logical layout and material flow constraints;
  b) the equipment and personnel standard production rates;
  c) the availability, the calendar and the status of the equipment and personnel;
  d) knowledge on the way of production (recipes, routings, etc.), process and business constraints;
  e) storage constraints like a central buffer for products which are produced according to one or more orders.
  f) the skills provided by the production resources Together with this information the DPS software builds its internal model of the plant and of the production process within this plant. Subsequently, by applying the scheduling algorithms to this internal plant model of the plant's resources and production process, the DPS software computes an executable production schedule which does not violate any physical, logistical production constraints and/or business constraints and which optimizes the manufacturing performance usually before production process execution.

Therefore, production scheduling is related to the detailed planning of the production execution phase, i.e. scheduling can be seen as detailed operative production planning.

Some data necessary for detailed scheduling planning can only be estimated/forecasted before the actual execution, e.g. operation duration like transport time on an autonomous guided vehicle (AGV) or processing time on machines. Thus, feedback from a real-time environment must continously be incorporated to guarantee that a schedule can be executed. Reliable schedules can only be generated for a short-term planning horizon.

According to U.S. Pat. No. 7,962,233 B2 a system for handling a production disturbance/opportunity event is known which includes a network having data processing units running a MES software for controlling/monitoring a production process operating production components. A production modeler defines a plant model of the production process, and a production scheduler generates an executable production schedule for the execution of operating procedures for the production components. A production executor executes the production process following the generated executable production schedule, and a production disturbance/opportunity event identifier detects a production disturbance event and identifies a production opportunity event which allows to maintain an efficiency of the production process at least as close as possible to an efficiency given by the executable production schedule as originally generated by the production scheduler. The production scheduler re-calculates an amended executable production schedule incorporating the identified production opportunity event, and the production executor executes the production process now following the re-calculated executable production schedule.

But such a schedule can only be generated for a short-term planning horizon. There are often long-term objectives involved, which should be considered in the decisions as well. One important example of such a long-term goal are due dates for individual orders. There is a need to avoid late deliveries but an order should not be completed too early. Schedule planning for such a scenario is particularly challenging in a high mix low volume production since the complexity of the underlying decision problem increases with the number of different tasks needed to be planned.

SUMMARY

It is therefore the object of the present invention to provide a method for providing dispatching decisions for operating a number of resources involved in a number of production processes wherein a used production schedule is enabled to consider short- and long-term aspects. The invention should meet sufficient quality as well.

The above-mentioned object is achieved by a method and one or more apparatus or a system, preferably a distributed system, according to the features of the independent claims. Preferred embodiments of the invention are described in the dependent claims. Any combination of the features of the dependent claims to each other and with the features of the independent claims is possible.

An aspect of the invention is a system for providing dispatching decisions for operating a number of resources involved in a number of production processes, each production process comprising a number of production operations, whereby the system comprises at least one processor which is configured to perform the following steps:
  a) obtaining a long-term production schedule containing production operations for a set of production orders by using forecasted values for production operation durations;
  b) deriving dispatching recommendations for suitable order release dates, dispatching sequences and/or resource choices of all subsequent operational dispatching decisions from the obtained long-term production schedule;
  c) obtaining a released subset of the set of production orders having each a release date and a due date and including information of all possible dispatching sequences and logical dependencies between them to produce a requested product;
  d) iteratively calculating a limited number of subsequent operational dispatching decisions based on operational constraints which are monitored during the said operation of the number of resources involved in the number of production processes and on the derived dispatching recommendations which support a decision-making in favor of optimizing the overall production process with respect to long-term objectives;
  e) outputting, by the at least one processor accessing an output device, each calculated operational dispatching decision to a production executer which can be connected to the output device and which is enabled to execute the released subset of production orders by operating the number of production processes according to the said subsequent operational dispatching decisions.

The at least one processor is preferably configured to repeat steps c), d) and e) until the long-term production needs to be adapted or re-calculated and/or any other quantity and/or quality requirement is met.

The Calculated limited number of said operational dispatching decisions can be additionally displayed on the output device in a Gantt chart.

According to an embodiment of the invention the at least one processor is additionally configured to return feedback from the production executer for the iterative calculating according to d).

The long-term objective should comprise due dates at which the orders should be completed.

An optimized sequence of the orders is a result from a backward scheduling, i.e. choosing last operations for the orders and scheduling them as late as possible before their due dates with the aim the orders are finished before the due date. Using backward iteration leads to such dispatching decisions wherein no operation finishes after its due date. But operations finish as late as possible while trying to minimize resource usage.

Only those dispatching recommendations should be incorporated into the calculation of the limited number of subsequent operational dispatching decisions whose order start times in the long-term production schedule are close to current time.

The obtained long-term production schedule can be built by relaxing at least one pre-determined production constraint in order to reduce the complexity of the long-term production scheduling comprising all orders of the set of production orders at once. Relaxing a (operational) production constraint could be for example that a product produced by one order is stored next to a machine; thus enabling AGVs to deliver their freight before the moment where it can be processed on a machine. Another possibility is to relax constraints in the material flow.

For each of the production operations a duration and a required amount of material and/or other resources should be determined. Machines and execution sequences should be chosen in such that processing transport and setup times are as short as possible.

During calculating the limited number of subsequent operational dispatching decisions availability of required material and/or resources for performing the production operations should be checked in real-time.

The long-term production schedule can finally be re-computed (feedback loop), by a coupled and/or connectable production scheduler. The production scheduler providing the long-term production schedule plan runs mostly offline prior to calculate the limited number of subsequent operational dispatching decisions.

A production process comprising a number of production operations which can include productive operations and unproductive operations. A productive operation is a work on a piece of a product. An unproductive operation could be a time- and/or resource-consuming operation like:
  a) tooling tasks for a resource;
  b) activating and deactivating of a resource;
  c) set-up operation of resources;
  d) transport of products; and
  e) loading and/or unloading of products.)

The invention can be implemented as a framework using an offline solution, which provides a long-term production schedule, to optimize a secondary goal and then use that information in a short-term decision process, normally a real-time scheduling. This can be applied in any dynamic production environment.
  1) An offline procedure taking care of long-term objectives (that could not be taken into account in a real time decision-making process) that focusses on the most important restrictions/constraints of the production process while relaxing less critical restrictions.
  2) A real time procedure using production execution feedback from a production executer of a plant as well as the offline results in order to take online decisions to control which processes/operations should be executed on the machines or transport resources in the next step.

A further aspect of the invention is a method for providing short-term production schedule decisions for the operations of a number of resources involved in a number of production processes, each production process comprising a number of production operations, comprising the following steps:
  a) obtaining a long-term production schedule containing production operations for a set of production orders by using forecasted values for production operation durations;
  b) deriving dispatching recommendations for suitable order release dates, dispatching sequences and/or resource choices of all subsequent operational dispatching decisions from the obtained long-term production schedule;
  c) obtaining a released subset of the set of production orders having each a release date and a due date and including information of all possible dispatching sequences and logical dependencies between them to produce a requested product;

d) iteratively calculating a limited number of subsequent operational dispatching decisions based on operational constraints which are monitored during the said operation of the number of resources involved in the number of production processes and on the derived dispatching recommendations which support a decision-making in favor of optimizing the overall production process with respect to long-term objectives;

e) outputting, by the at least one processor accessing an output device, each calculated operational dispatching decision to a production executer which can be connected to the output device and which is enabled to execute the released subset of orders by operating the number of production processes according to the said subsequent operational dispatching decisions.

Preferably, steps c), d) and e) are continuously repeated until the long-term production schedule has been adapted or re-calculated.

Embodiments as described above for the system can be analogous applied for the method and for computer program (product) and for the computer-readable storage medium.

This system which can be implemented by hardware, firmware and/or software or a combination of them.

The computer-readable storage medium stores instructions executable by one or more processors of a computer, wherein execution of the instructions causes the computer system to perform the method.

The computer program (product) is executed by one or more processors of a computer and performs the method.

BRIEF DESCRIPTION

Figure 2:
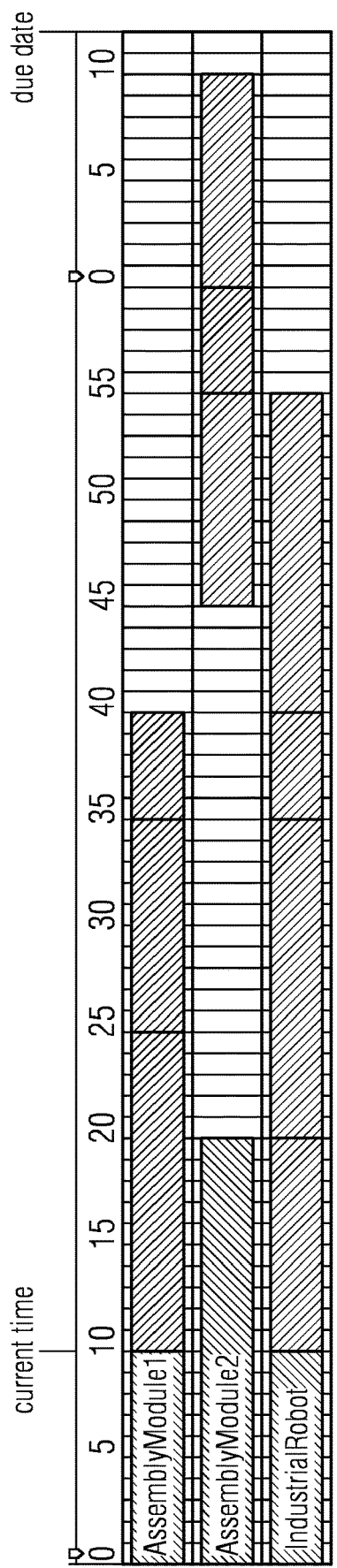

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following figures:

FIG. 1 depicts a schematic overview over the activities and the main information flows with a manufacturing executions system (MES) according to the present invention; and FIG. 2 shows a schematic overview over a generated production schedule plan that is displayed as a Gantt chart.

DETAILED DESCRIPTION

Schedule generation schemes need a lot of data input in order to be able to generate a production schedule plan. The most important data source is a system that holds or defines the BoP (Bill of process), which can be determined as solutions of specified sequencing and precedence and/or priority constraints (in contrast to explicit static definitions of all executable BoPs, stored for instance in an MES system).

In this example a production environment is given with flexible machines which require different shared tools for different operations. Moreover, automated transports between machines, sequence dependent setup times and handover times between AGVs and machines also should be considered. Each product order comes with a set of production operations, which shall be sequentially processed.

FIG. 1 illustrates in the light of the afore-mentioned example a schematic overview over the activities and the main information flows with a manufacturing execution system MES. Any arrow numbered with numerals shall indicate a flow of data and/or data stream. At 1 and 2 data streaming from a production executer P comprising production executing units goes to the MES system MES and vice versa resp. At 5 and 6 data streaming from an operational scheduling decision system RS can go to an additional execution system ES and vice versa. The additional execution system ES can be a dispatching system for autonomous guided vehicles and/or a material providing system. At 12 and 13 the additional execution system ES can communicate with the MES system as well. At 8 and 11 the data streaming from a data base DB, which can contain shop floor data sources (e.g. from SAP) and vice versa. Collected data in the data base can be a set of production orders having a start time and a due date and including the introduced sequencing and constraints in the beginning which bring about sequences of production operations and logic dependencies between them. The data collection can also include forecasted values for operation durations. The operational scheduling decision system itself forwards at 3 its scheduling decisions to the MES system and at 4 the MES system returns feedback data to the operational scheduling decision system.

After 3 outputting calculated operational dispatching decision by the operational scheduling decision system can be done with an output device where a Grantt chart can be shown.

This approach now offers the opportunity that the operational scheduling decision system decides in knowledge of a long-term schedule which can come from a not shown offline scheduling system and contains a set of production constraints.

At 9 the operational scheduling decision system obtains derived dispatching recommendations for suitable order release dates, dispatching sequences and/or resource choices of all subsequent operational dispatching decisions from the long-term production schedule PS.

Subsequent scheduling decisions can build an operational production schedule. At 4 a released subset of the set of production orders by e.g. the MES system is obtained by the operational scheduling decision system.

Availability of required material and/or resources for performing the production is also considered in the long-term production schedule at 10. The long-term production schedule can be built by relaxing at least one pre-determined production constraint in order to reduce the complexity of the long-term production scheduling comprising all orders of the set of production orders. For example, the only storage facility is a central buffer where a produced product can be stored (=resource constraint). In this example the resource constraint is relaxed, i. e. a product can be stored next to a machine. This decouples the strong relation between transport and machine availability and will result in a slightly optimistic schedule.

The operational production constraints can be monitored by the executing units during the production processes and monitoring feedback can be forwarded via the MES system to the operational scheduling decision system.

With the aid of a calculated limited set of operational dispatching decisions the sequence of orders can be optimized.

The limited number of subsequent operational dispatching decisions is iteratively calculated by the operational scheduling decision system based on operational constraints which are monitored during the said operation of the number of resources involved in the number of production processes and on the derived dispatching recommendations which support a decision-making in favor of optimizing the overall production process with respect to long-term objectives.

Obtaining the released subset of the set of production orders, said iterative calculation and outputting the result of the calculation can be (continuously) repeated until the long-term production schedule has been adapted or re-calculated.

At 9 a new amended long-term production schedule by re-computing the scheduling after the feedback from the operational scheduling decision system is also possible.

Amended scheduling decisions can be returned and/or forwarded from the operational scheduling decision system at 7 over the MES system.

This optimization is succeeded by placing the start time of an order in the sequence in such a way that the order is completed as close to their due dates as possible. Each order has a release date and a due date.

Finally, the goal is to finish each product of an order as close to its due date as possible since early completion requires additional storage capacity and late completion incurs penalty fees and decreases customer satisfaction.

So scheduling is iterated backwards, choosing last operations for the orders and scheduling them as late as possible. They are completed before the due date and no operation finishes after its due date. This minimizes resource usage.

According to an embodiment of the invention, the choices might be fixed in the next step. The schedule can be adapted if there were orders which would have started before the current time. Start time for each order is provided by the long-term production schedule. Instead of choosing between all schedulable options during (online) calculation of the schedule, only those orders are considered where the offline start time is near the current time. For instance, if the current time is 3.10 p.m., then orders with a start time 4.10 p.m. provided by the long-term production schedule are not considered. Preferably a range around the current time is pre-determined, e.g. an hour, where orders with a start time falling in this range are considered. This reduces the complexity and leads to order distribution in respect to the due dates.

The example according to FIG. 2 will be presented for a small production environment with assumed two static (i.e. non-movable) assembly modules and an industrial robot that can perform productive operations as well as transport operations between the two assembly modules (this means, that we can either think of a moveable gripper of a static robot or we could even consider a moveable robot).

A partial schedule in FIG. 2 is represented in a Gantt chart. On top there is a timeline representing a part of the order duration, e.g. an hour. The current time could be 3.10 p.m. Then the end of the timeline would represent 4.10 p.m. An example for scheduled operations is shown as grey bars and are not named explicitly.

Production operations can include productive operations and unproductive operations. A productive operation is a work on a piece of a product. An unproductive operation could be a time- and/or resource-consuming operation like:
  a) tooling tasks for a resource;
  b) activating and deactivating of a resource;
  c) set-up operation of resources;
  d) transport of products; and
  e) loading and/or unloading of products.)

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for providing short-term dispatching decisions for operating a number of resources involved in a number of production processes, each production process comprising a number of production operations for at least one industrial robot, wherein the system comprises at least one processor which is configured to perform the following steps:
   a) obtaining a long-term production schedule containing production operations for a set of production orders by using forecasted values for production operation durations, wherein the long-term production schedule is received from an offline scheduling system and includes a set of pre-determined production constraints, and wherein at least one pre-determined production constraint of the set of pre-determined production constraints is relaxed in order to reduce the complexity of the long- term production scheduling comprising all orders of the set of production orders at once;
   b) deriving dispatching recommendations for suitable order release dates, dispatching sequences and/or resource choices of all subsequent operational dispatching decisions from the obtained long-term production schedule;
   c) obtaining a released subset of the set of production orders having each a release date and including information of all possible dispatching sequences and logical dependencies between them to produce a requested product;
   d) iteratively calculating a limited number of subsequent short-term operational dispatching decisions based on operational constraints which are monitored during the said operation of the number of resources involved in the number of production processes and on the derived dispatching recommendations which support a decision-making in favor of optimizing the overall production process with respect to long-term objectives, wherein the long-term objectives comprise respective due dates at which respective individual orders of the subset of production orders should be completed, wherein optimizing the overall production process includes backward iteration wherein respective start times of the respective individual orders are placed in such a way that the respective individual orders are completed as close to the respective due date as possible, and wherein only those dispatching recommendations whose order start times in the long-term production schedule are within a predetermined range of a current time are incorporated into the calculation of the limited number of subsequent operational dispatching decisions;
   e) outputting, by the at least one processor accessing an output device, each calculated short-term operational dispatching decision to a production executer; and
   f) executing the released subset of production orders by operating the number of production processes according to the said subsequent short-term operational dispatching decisions and controlling performance of the production operations by the at least one industrial robot.

2. The system according to claim 1, wherein the at least one processor is configured to repeat steps c), d) and e) until the long-term production schedule has been adapted or re-calculated.

3. The system according to claim 1, wherein feedback from the production executer is returned for the iterative calculating according to d).

4. The system according to claim 1, wherein during calculating the limited number of subsequent operational dispatching decisions availability of required material and/or resources for performing the production operations is checked in real-time.

5. The system according to claim 1, wherein the relaxed at least one pre-determined production constraint relates to delivery by an autonomous guided vehicle.

6. The system according to claim 1, wherein each production process can include productive production operations and unproductive production operations.

7. The system according to the claim 1, wherein the calculated limited number of said operational dispatching decisions can be displayed on the output device in a Gantt chart.

8. A method for providing short-term production schedule decisions for the operations of a number of resources involved in a number of production processes, each production process comprising a number of production operations for at least one industrial robot, comprising the following steps:
   a) obtaining a long-term production schedule containing production operations for a set of production orders by using forecasted values for production operation durations, wherein the long-term production schedule is received from an offline scheduling system and includes a set of pre-determined production constraints, and wherein at least one pre-determined production constraint of the set of pre-determined production constraints is relaxed in order to reduce the complexity of the long-term production scheduling comprising all orders of the set of production orders at once;
   b) deriving dispatching recommendations for suitable order release dates, dispatching sequences and/or resource choices of all subsequent operational dispatching decisions from the obtained long-term production schedule;
   c) obtaining a released subset of the set of production orders having each a release date and including information of all possible dispatching sequences and logical dependencies between them to produce a requested product;
   d) iteratively calculating a limited number of subsequent short-term operational dispatching decisions based on operational constraints which are monitored during the said operation of the number of resources involved in the number of production processes and on the derived dispatching recommendations which support a decision-making in favor of optimizing the overall production process with respect to long-term objectives, wherein the long-term objectives comprise respective due dates at which respective individual orders of the subset of production orders should be completed, wherein optimizing the overall production process includes backward iteration wherein respective start times of the respective individual orders are placed in such a way that the respective individual orders are completed as close to the respective due date as possible, and wherein only those dispatching recommendations whose order start times in the long-term production schedule are within a predetermined range of a current time are incorporated into the calculation of the limited number of subsequent operational dispatching decisions;
   e) outputting, by the at least one processor accessing an output device, each calculated short-term operational dispatching decision to a production executer; and f) executing the released subset of production orders by operating the number of production processes according to the said subsequent short-term operational dispatching decisions and controlling performance of the production operations by the at least one industrial robot.

9. The method according to claim 8, wherein steps c), d) and e) are repeated until the long-term production schedule has been adapted or re-calculated.

10. A computer program product, comprising a non-transitory computer readable storage media having computer readable program code stored therein, the computer readable program code executable by a processor of a computer system to implement a method for providing short-term production schedule decisions for the operations of a number of resources involved in a number of production processes, each production process comprising a number of production operations for at least one industrial robot, comprising the following steps:
  a) obtaining a long-term production schedule containing production operations for a set of production orders by using forecasted values for production operation durations, wherein the long-term production schedule is received from an offline scheduling system and includes a set of pre-determined production constraints, and wherein at least one pre-determined production constraint of the set of pre-determined production constraints is relaxed in order to reduce the complexity of the long-term production scheduling comprising all orders of the set of production orders at once;
  b) deriving dispatching recommendations for suitable order release dates, dispatching sequences and/or resource choices of all subsequent operational dispatching decisions from the obtained long-term production schedule;
  c) obtaining a released subset of the set of production orders having each a release date and including information of all possible dispatching sequences and logical dependencies between them to produce a requested product;
  d) iteratively calculating a limited number of subsequent short-term operational dispatching decisions based on operational constraints which are monitored during the said operation of the number of resources involved in the number of production processes and on the derived dispatching recommendations which support a decision-making in favor of optimizing the overall production process with respect to long-term objectives, wherein the long-term objectives comprise respective due dates at which respective individual orders of the subset of production orders should be completed, wherein optimizing the overall production process includes backward iteration wherein respective start times of the respective individual orders are placed in such a way that the respective individual orders are completed as close to the respective due date as possible, and wherein only those dispatching recommendations whose order start times in the long-term production schedule are within a predetermined range of a current time are incorporated into the calculation of the limited number of subsequent operational dispatching decisions;
  e) outputting, by the at least one processor accessing an output device, each calculated short-term operational dispatching decision to a production executer; and
  f) executing the released subset of production orders by operating the number of production processes according to the said subsequent short-term operational dispatching decisions and controlling performance of the production operations by the at least one industrial robot.

11. The computer program product according to claim 10, wherein the production processes further include a number of production operations for at least one assembly module, and wherein the method for providing short-term production schedule decisions includes controlling performance of the production operations by the at least one assembly module.

12. The system according to claim 1, wherein the production processes further include a number of production operations for at least one assembly module, and wherein the at least one processor is further configured to control performance of the production operations by the at least one assembly module.

13. The method according to claim 8, wherein the production processes further include a number of production operations for at least one assembly module, and wherein the method further comprises controlling performance of the production operations by the at least one assembly module.

14. The computer program product according to claim 11, wherein the at least one pre-determined production constraint is a storage constraint and/or material flow constraint.

15. The system according to claim 12, wherein the at least one pre-determined production constraint is a storage constraint and/or material flow constraint.

16. The method according to claim 13, wherein the at least one pre-determined production constraint is a storage constraint and/or material flow constraint.

\* \* \* \* \*